United States Patent
Roberts

(10) Patent No.: US 6,577,866 B1
(45) Date of Patent: Jun. 10, 2003

(54) METHOD OF CO-OPERATION BETWEEN ENTITIES OF A CELLULAR MOBILE RADIO NETWORK DURING CALL HANDOVER

(75) Inventor: Michael Roberts, Neuilly S/Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/245,335

(22) Filed: Feb. 5, 1999

(30) Foreign Application Priority Data

Feb. 6, 1998 (FR) .............................. 98 01443

(51) Int. Cl.[7] ................................ H04Q 7/20
(52) U.S. Cl. ................. 455/436; 455/452; 455/439; 455/510
(58) Field of Search ................. 455/436, 453, 455/452, 438, 423, 67.1, 560, 442, 439, 414, 404

(56) References Cited

U.S. PATENT DOCUMENTS

| | | | | |
|---|---|---|---|---|
| 5,081,671 A | * | 1/1992 | Raith et al. ................. | 455/436 |
| 5,301,356 A | * | 4/1994 | Bodin et al. ................ | 455/436 |
| 5,437,054 A | * | 7/1995 | Rappaport et al. .......... | 455/447 |
| 5,551,062 A | * | 8/1996 | Drozt et al. ................ | 455/512 |
| 5,749,055 A | * | 5/1998 | Dahlin ....................... | 455/439 |
| 5,873,035 A | * | 2/1999 | Ladden ...................... | 455/436 |
| 5,884,174 A | * | 3/1999 | Nagarajan ................... | 455/436 |
| 5,903,840 A | * | 5/1999 | Bertacchi ................... | 455/436 |
| 5,940,762 A | * | 8/1999 | Lee ............................ | 455/442 |
| 6,131,029 A | * | 10/2000 | Roberts et al. ............. | 455/438 |
| 6,141,565 A | * | 10/2000 | Feuerstein .................. | 455/560 |
| 6,157,838 A | * | 12/2000 | Di Huo ....................... | 455/439 |
| 6,192,232 B1 | * | 2/2001 | Iseyama et al. ............. | 455/404 |
| 6,219,541 B1 | * | 4/2001 | Brodie ........................ | 455/422 |

FOREIGN PATENT DOCUMENTS

| | | |
|---|---|---|
| EP | 0 669 775 A2 | 8/1995 |
| WO | WO 97/26770 | 7/1997 |

* cited by examiner

*Primary Examiner*—Nguyen T. Vo
*Assistant Examiner*—John J Lee
(74) *Attorney, Agent, or Firm*—Sughrue Mion, PLLC

(57) ABSTRACT

A method of co-operation between entities of a cellular mobile radio network for allocating radio resources in the event of call handover, wherein, in the event of a request to hand over from a server cell controlled by a server network entity to a target cell controlled by a target network entity separate from said server entity, in order to determine if handover to that target cell is possible, said target cell being referred to as a rejected cell if such handover proves impossible, said server entity informs said target entity of parameters used to fix the conditions under which said target cell is to be considered a rejected cell.

6 Claims, 3 Drawing Sheets

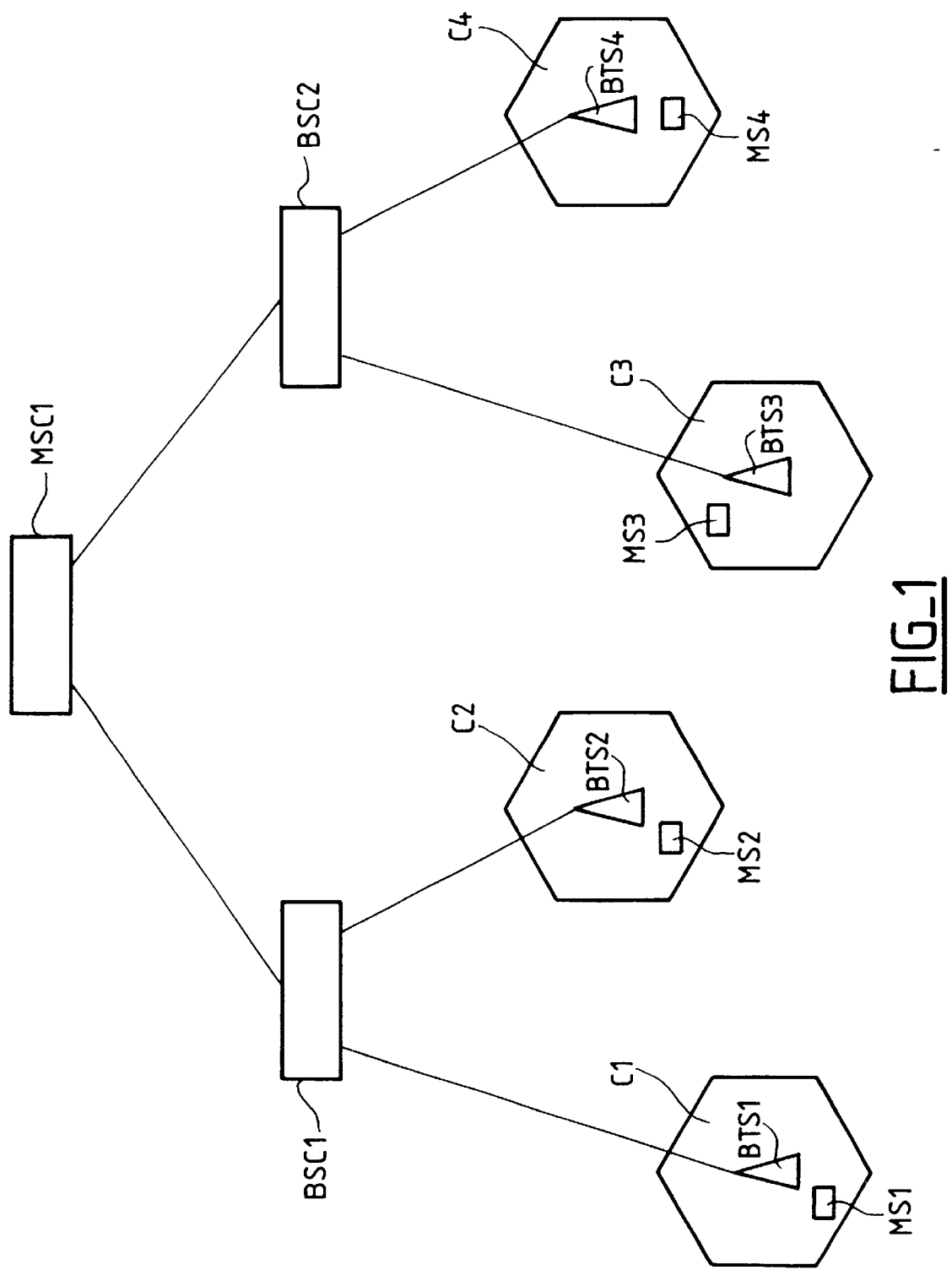
FIG_1

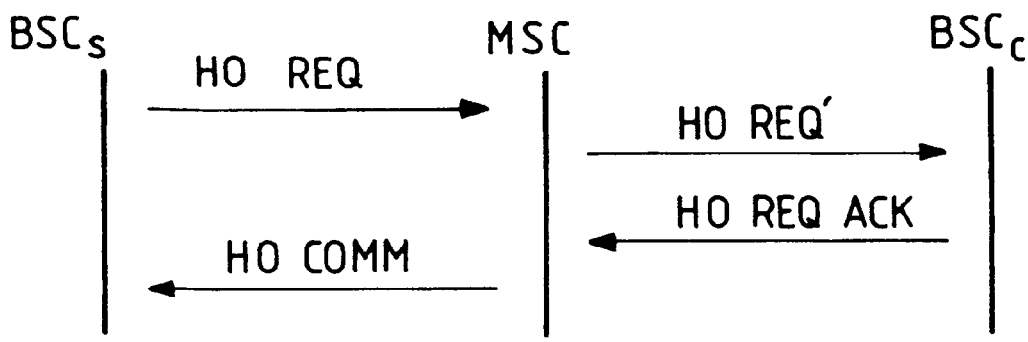
FIG_2
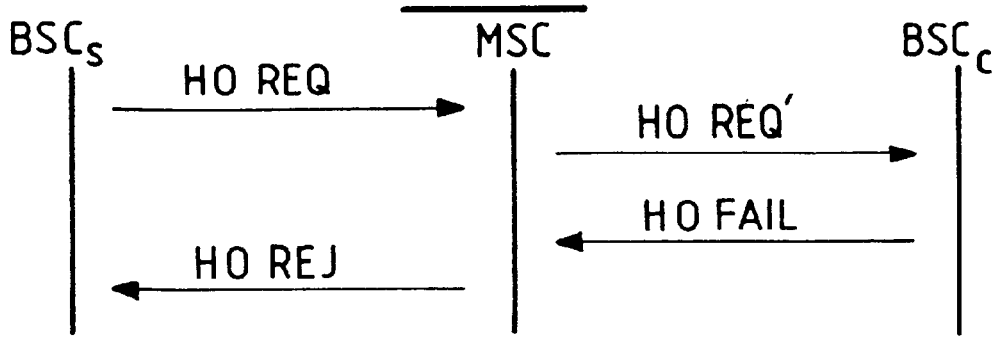
FIG_3
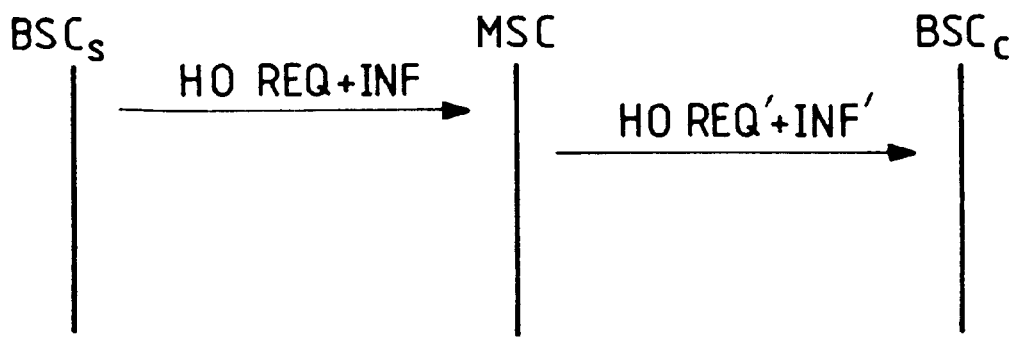
FIG_4

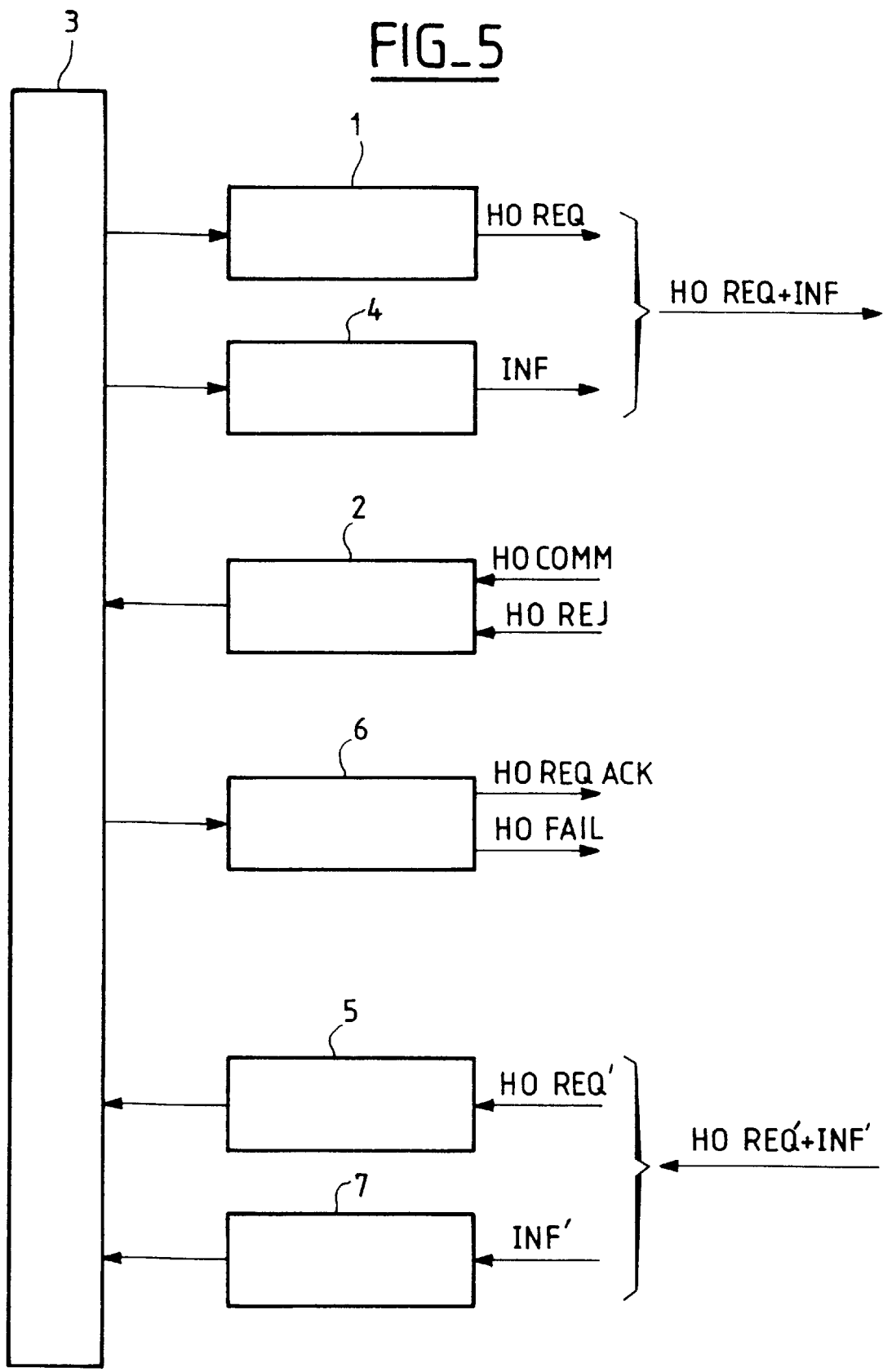

METHOD OF CO-OPERATION BETWEEN ENTITIES OF A CELLULAR MOBILE RADIO NETWORK DURING CALL HANDOVER

The present invention concerns cellular mobile radio systems and more particularly managing radio resources in such systems and even more particularly managing radio resources in such systems during call handover.

BACKGROUND OF THE INVENTION

FIG. 1 shows the general architecture of a cellular mobile radio system, for example the Global System for Mobile communications (GSM). A system of this kind essentially comprises:

- a set of base transceiver stations (BTS) such as those designated BTS1, BTS2, BTS3 and BTS4, each base transceiver station being allocated to one cell, respectively designated C1, C2, C3 and C4, and the base transceiver stations communicating with mobile stations in those cells, such as stations MS1, MS2, MS3, MS4, in the example shown (other examples are possible, of course, with the same BTS allocated to more than one cell),
- a set of base station controllers (BSC), such as those designated BSC1 and BSC2, each BSC controlling a subset of cells from the radio resource management point of view, base station controller BSC1 controlling cells C1 and C2 and base station controller BSC2 controlling cells C3 and C4 in the example shown,
- a set of mobile switching centers (MSC), such as that designated MSC1, each MSC being connected to external networks, including the Public Switched Telephone Network (PSTN) or the Integrated Services Digital Network (ISDN) in particular, and controlling a subset of base station controllers from the call management point of view, mobile switching center MSC1 controlling base station controllers BSC1 and BSC2 in the example shown.

In a system of the above kind the network decides to hand over a call on the basis of a number of parameters including the results of measurements on radio signals for the current server cell and for neighboring cells of the current server cell.

The cell to which the call is to be handed over, called the new server cell, is chosen from a set of candidate cells selected by the network from the neighboring cells on the basis of the measurement results in the following manner.

Call handover to the best candidate cell is requested first. If handover proves possible, the best candidate cell constitutes the new server cell. If handover proves impossible, then handover to the next candidate cell is requested, in the order of preference of the candidate cells, and so on.

A candidate cell to which handover is requested is also known as a target cell.

A target cell to which a requested handover proves impossible is also called a rejected cell. Thus a target cell can be rejected, in particular because the mobile station does not succeed in setting up a link with the network in that cell, or because no radio resource is available in that cell because of a traffic overload, or because a checking or maintenance operation is in progress in that cell, the above list evidently not being limiting.

In the case of a target cell controlled by the same BSC as the current server cell, which corresponds in FIG. 1, for example, to a request to hand over a call from cell C1 to cell C2 or from cell C3 to cell C4 (handover of this kind is known as internal handover or intra-BSC handover), the BSC concerned is able itself to determine, internally, if handover to that target cell is possible or not, i.e. whether it is a rejected cell or not, because that BSC controls the radio resources for both cells.

In the case of a target cell controlled by a target BSC other than the current server BSC (referred to for simplicity hereinafter as the server BSC) controlling the current server cell (referred to for simplicity hereinafter as the server cell), which corresponds in FIG. 1, for example, to a request to hand over a call from cell C1 or C2 to cell C3 or C4 (handover of this kind is known as external handover or inter-BSC handover), the server BSC is not itself able to determine, internally, whether handover to that target cell is possible or not, i.e. whether or not it is a rejected cell, and the procedure used is then that outlined in FIG. 2 or 3, namely:

- the server base station controller BSCs first sends the MSC a handover request message ("Handover Required" message HO REQ),
- the MSC sends the target base station controller BSCc a message of the same type ( "Handover Request" message HO REQ'),
- the target BSC, after determining internally if handover to that target cell is possible or not, i.e. whether it is a rejected cell or not, sends the MSC either, in the case of a non-rejected cell (FIG. 2), a handover request acknowledgment message (HO REQ ACK) itself containing a handover command message, or, in the case of a rejected cell (FIG. 3), a message indicating that it is impossible to hand over to that target cell ("Handover Failure" message HO FAIL),
- the MSC then sends the server BSC a message of the same kind, namely either a handover command message (HO COMM) or a message indicating that it is impossible to hand over to that target cell ("Handover Required Reject" message HO REJ).

If a request for handover to a target cell receives a negative first response, it can be placed in a queue and repeated subsequently, within a predetermined time limit, this queuing technique being known per se. However, this technique may not be applied uniformly to all calls. For example, it may be decided that said predetermined time period can be relatively longer for an outgoing call, i.e. for a call sent by a mobile station, than for an incoming call, i.e. for a call received by a mobile station. The invention is not limited to an example of the above kind, however, and in particular covers the converse situation of deciding that said predetermined time period can be relatively longer for an incoming call than for an outgoing call, along with other examples of parameters beneficial for fixing said predetermined time period, or more generally for fixing the conditions under which a target cell is considered to be a rejected cell.

Here the general problem arises that in the case of external handover and when only the server BSC knows such parameters (which applies in particular to parameters consisting in the incoming or outgoing nature of the call), the target BSC may not apply said queuing technique optimally, or more generally any technique using such parameters to determine if a target cell is a rejected cell or not.

OBJECTS AND SUMMARY OF THE INVENTION

One aim of the present invention is to avoid this problem, i.e. to optimize the operation of the network in such cases, and more generally to improve co-operation between network entities in the event of call handover.

Accordingly the present invention consists in a method of co-operation between entities of a cellular mobile radio network for allocating radio resources in the event of call handover, wherein, in the event of a request to hand over from a server cell controlled by a server network entity to a target cell controlled by a target network entity separate from said server entity, in order to determine if handover to that target cell is possible, said target cell being referred to as a rejected cell if such handover proves impossible, said server entity informs said target entity of parameters used to fix the conditions under which said target cell is to be considered a rejected cell.

In accordance with another feature of the invention said parameters include parameters used to fix a predetermined time period during which a handover request of the above kind can be repeated if necessary.

In accordance with another feature of the invention said parameters include parameters relating to the incoming or outgoing nature of the call.

The present invention also consists in a cell control entity for cellular mobile radio networks, in particular a BSC for a GSM type network, for implementing a method of the above kind.

BREIF DESCRIPTION OF THE DRAWINGS

Other objects and features of the present invention will become apparent on reading the following description of one embodiment of the invention, which is given with reference to the accompanying drawings, in which:

FIG. 1 shows diagrammatically the organization of a cellular mobile radio network such as the GSM network in particular, FIG. 2 is a diagram showing various messages exchanged between various entities of a network of the above kind during an external handover request in the situation in which handover proves possible, FIG. 3 is a diagram showing various messages exchanged between various entities of a network of the above kind during an external handover request in the situation in which handover proves impossible, FIG. 4 is a diagram illustrating one example of the co-operation method of the invention, and FIG. 5 is a diagram showing one example of means to be used in accordance with the invention in a cell control entity for a cellular mobile radio network (in particular a BSC for a GSM type network).

MORE DETAILED DESCRIPTION

Thus the present invention concerns a method of co-operation between entities of a cellular mobile radio network for allocating radio resources during call handover.

In accordance with the invention, to improve co-operation between network entities in the event of a request to hand over a call from a server cell controlled by a server entity of the network to a target cell controlled by a target entity of the network separate from said server entity, in order to determine if the requested handover to that target cell is possible, said target cell being called a rejected cell if such handover proves to be impossible, said server entity informs said target entity of parameters used to fix the conditions under which said target cell is to be considered a rejected cell.

In the embodiment described with reference to FIGS. 4 and 5, said information on parameters used to fix the conditions under which a target cell is to be considered a rejected cell is transmitted from the server entity BSCs to the target entity BSCc via the (higher level) entity MSC providing the connection between the server entity and the target entity.

Thus in the FIG. 4 diagram such information INF is associated with the message HO REQ sent to the MSC by the server base station controller BSCs using the procedure outlined above with reference to FIGS. 2 and 3.

The information, now designated INF', is forwarded by the MSC to the target base station controller BSCc and in the example shown is associated with the corresponding message HO REQ' forwarded by the MSC to the target base station controller BSCc.

In a different embodiment, not specifically shown, it would also be possible for each target entity to be informed of parameters used to fix the conditions under which a target cell is to be considered a rejected cell by the MSC entity instead of the current server entity. An embodiment of this kind corresponds in particular to the situation in which the current server entity sends the MSC a list of candidate cells and the MSC effects the corresponding successive handover requests itself.

FIG. 5 is a diagram illustrating the type of means to be employed in accordance with one embodiment of the invention in a cell control entity for a cellular mobile radio network, in particular the BSC entity in a GSM type network.

In a manner that is known per se, and consequently is not described in detail here, a BSC entity of the above kind includes, when the controlled cell is a server cell, means 1 for sending a handover request message (HO REQ) to a target cell and means 2 for receiving messages (HO COM, HO REJ) in response to such requests, the means 1 and 2 operating in conjunction with radio resource management means 3 in a manner that is known per se.

In the example shown the BSC entity also includes, when the controlled cell is a server cell, means 4 for sending information INF on parameters used to fix the conditions under which a target cell is to be considered a rejected cell. In the example shown the information INF is sent in association with the handover request message HO REQ.

To this end the means 4 receive information supplied by the radio resource management means 3 on parameters used to fix the conditions under which a target cell is to be considered a rejected cell and converts the received information into a form suitable for sending to the MSC entity, constituting the information INF.

As also known per se, and consequently not described here in detail, a BSC entity of the above kind includes, when the controlled cell is a target cell, means 5 for receiving handover request messages (HO REQ') and means 6 for sending either handover request acknowledgment messages (HO REQ ACK) or messages (HO FAIL) indicating that handover to that target cell is impossible, the means 5 and 6 operating in conjunction with the radio resource management means 3, again in a manner known per se.

In the example shown the BSC entity further includes, when the controlled cell constitutes a target cell, means 7 for receiving information INF' on parameters used to fix the conditions under which a target cell is to be considered a rejected cell. In the example shown the information INF' is received in association with a handover request message HO REQ'.

The radio resource management means 3 are controlled by the means 7 to fix in the means 3 the conditions under which a target cell is to be considered a rejected cell.

The means 1 for sending handover request messages (REQ), the means 2 for receiving messages (HO REJ, HO COMM) in response to such requests, the means 4 for receiving handover request messages (HO REQ'), the means 5 for sending either handover request acknowledgment messages (HO REQ ACK) or messages (HO FAIL) indicating that it is impossible to hand over to a target cell, and the radio resource management means 3 (in respect of their functions other than those relating to the present invention), can be conventional means which therefore do no need to be described here.

The particular embodiment of the means 4 for sending information INF on parameters used to fix the conditions under which a target cell is to be considered a rejected cell, the means 7 for receiving corresponding information INF' and functions specific to the radio resource management means 3 relating to the present invention required for the system to operate in accordance with the method described by means of the above example will be evident to the skilled person and so do not require to be specifically described.

The invention is not limited to the embodiment described and generally improves co-operation between entities of a cellular mobile radio network in the case of external call handover.

What is claimed is:

1. A method of co-operation between entities of a cellular mobile radio network for allocating radio resources in the event of a request for a call handover from a server cell controlled by a server network entity to a target cell controlled by a target network entity separate from said server network entity, wherein said target cell is referred to as a rejected cell if the call handover is not possible, said method comprising transmitting, from said server network entity to said target network entity, parameters used to fix the conditions under which said target cell is to be considered the rejected cell in order to determine if the call handover to the target cell is possible.

2. The method according to claim 1, wherein said parameters include parameters relating to a predetermined time period during which the request for the call handover can be repeated, if necessary.

3. The method according to claim 1, wherein said parameters include parameters relating to an incoming or outgoing nature of the call.

4. A cell control entity for controlling at least one cell in a cellular mobile radio network, the cell control entity comprising:

means for sending to a target control entity information on parameters used to fix the conditions under which a target cell controlled by a target control entity is to be considered a rejected cell to which a call handover is not possible, when the cell controlled by the cell control entity is a server cell from which the call handover is requested and the cell control entity is a server entity which controls the server cell, and means for receiving from the server control entity information on parameters used to fix the conditions under which the target cell is to be considered a rejected cell to which the call handover is not possible, when the cell controlled by the cell control entity is the target cell to which the handover is requested and the cell control entity is the target entity which controls the target cell.

5. The cell control entity according to claim 4, wherein said parameters include parameters relating to a predetermined time period during which a request for the call handover can be repeated, if necessary.

6. The call control entity according to claim 4, wherein said parameters include parameters relating to an incoming or going nature of the call.

* * * * *